US010979305B1

(12) United States Patent
Finci et al.

(10) Patent No.: US 10,979,305 B1
(45) Date of Patent: Apr. 13, 2021

(54) WEB INTERFACE USAGE TRACKER

(71) Applicant: Wells Fargo Bank, N.A., San Francisco, CA (US)

(72) Inventors: Shelley Robbins Finci, Greenbrae, CA (US); Miguel A. Ruiz, Walnut Creek, CA (US); Sabrina Y. Yen, Fairfax, VA (US); Robin T. Brinckerhoff, San Francisco, CA (US); Tracy W. Chan, San Francisco, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 303 days.

(21) Appl. No.: 15/394,665

(22) Filed: Dec. 29, 2016

(51) Int. Cl.
*H04L 12/24* (2006.01)
*H04L 12/14* (2006.01)
*H04L 29/08* (2006.01)
*G06Q 10/10* (2012.01)
*G06Q 30/00* (2012.01)

(52) U.S. Cl.
CPC ........ *H04L 41/145* (2013.01); *H04L 12/1403* (2013.01); *H04L 67/22* (2013.01); *G06Q 10/1095* (2013.01); *G06Q 30/016* (2013.01)

(58) Field of Classification Search
CPC ... H04L 41/145; H04L 12/1403; H04L 67/22; G06Q 10/1095; G06Q 30/016; G06Q 30/00
See application file for complete search history.

(56) References Cited

U.S. PATENT DOCUMENTS

| | | | |
|---|---|---|---|
| 6,850,252 B1 * | 2/2005 | Hoffberg | G06K 9/00369 348/E7.061 |
| 7,016,864 B1 | 3/2006 | Notz et al. | |
| 7,023,979 B1 * | 4/2006 | Wu | H04M 3/5233 379/265.11 |
| 7,320,031 B2 | 1/2008 | Konig | |
| 7,644,134 B2 | 1/2010 | Cohen et al. | |
| 7,730,063 B2 * | 6/2010 | Eder | G06N 5/022 707/736 |
| 7,958,234 B2 | 6/2011 | Thomas et al. | |
| 8,090,679 B2 | 1/2012 | Zhuge et al. | |
| 8,166,016 B2 | 4/2012 | Higgins et al. | |

(Continued)

OTHER PUBLICATIONS

Spiess, Jeffrey, et al., "Using Big Data to Improve Customer Experience and Business Performance", Bell Labs Technical Journal 18, No. 4 (2014): 3-17, (2014), 15 pgs.

*Primary Examiner* — Patrice L Winder
*Assistant Examiner* — Angela M Widhalm De Rodrig
(74) *Attorney, Agent, or Firm* — Schwegman Lundberg & Woessner, P.A.

(57) ABSTRACT

Among other things, embodiments of the present disclosure can help monitor activity of customers using web portals to access services. Examples of such activity include log-ins to a web portal, views of account statements through the web portal, transactions made on the account, and the like. Embodiments of the present disclosure can generate a model relating customer characteristics to expected account activity. The system can apply the model to individual customers and compares actual account activity to expected account activity. If a mismatch is detected, the system may generate an alert message directed to a administrator or other type of user who can contact the customer to troubleshoot the identified issues.

17 Claims, 3 Drawing Sheets

(56) References Cited

U.S. PATENT DOCUMENTS

| | | | |
|---|---|---|---|
| 8,200,506 B2* | 6/2012 | Kil | G06Q 40/08 705/3 |
| 8,200,527 B1* | 6/2012 | Thompson | G06Q 10/0639 705/7.39 |
| 8,352,396 B2 | 1/2013 | Forman et al. | |
| 8,423,452 B1 | 4/2013 | Ley et al. | |
| 8,635,132 B1 | 1/2014 | Wilks et al. | |
| 8,635,142 B2 | 1/2014 | Moran et al. | |
| 8,689,110 B2* | 4/2014 | Verma | G06Q 30/06 715/744 |
| 8,976,955 B2 | 3/2015 | Liberman Ben-ami et al. | |
| 9,529,864 B2* | 12/2016 | Sundelin | G06F 16/24575 |
| 10,133,461 B1* | 11/2018 | Roberts | G06F 9/445 |
| 10,162,734 B1* | 12/2018 | Podgorny | G06F 11/366 |
| 2002/0082816 A1* | 6/2002 | Nguyen | G05B 19/41885 703/13 |
| 2002/0083067 A1* | 6/2002 | Tamayo | G06F 16/951 |
| 2002/0184610 A1* | 12/2002 | Chong | G06F 8/20 717/109 |
| 2004/0006476 A1* | 1/2004 | Chiu | H04M 3/4936 704/270.1 |
| 2004/0015824 A1* | 1/2004 | Felkey | H04M 15/745 717/104 |
| 2004/0133876 A1* | 7/2004 | Sproule | G06Q 10/067 717/105 |
| 2006/0019679 A1* | 1/2006 | Rappaport | G01S 5/0252 455/456.5 |
| 2007/0038963 A1* | 2/2007 | Moore | G05B 23/0267 715/859 |
| 2008/0270256 A1* | 10/2008 | Caballero | G06Q 30/0621 705/26.81 |
| 2008/0294996 A1* | 11/2008 | Hunt | G06Q 30/02 715/739 |
| 2009/0012826 A1* | 1/2009 | Eilam | G06Q 30/02 705/7.31 |
| 2009/0077033 A1* | 3/2009 | McGary | G06F 16/24578 |
| 2009/0132366 A1 | 5/2009 | Lam et al. | |
| 2009/0144625 A1* | 6/2009 | Muller | G06F 9/451 715/723 |
| 2009/0254971 A1* | 10/2009 | Herz | G06Q 30/0603 726/1 |
| 2010/0009332 A1* | 1/2010 | Yaskin | G09B 7/00 434/362 |
| 2010/0131857 A1* | 5/2010 | Prigge | G06F 8/10 715/744 |
| 2010/0153330 A1* | 6/2010 | Desikachari | G06F 11/3433 706/59 |
| 2010/0299433 A1* | 11/2010 | De Boer | H04L 47/14 709/224 |
| 2011/0022641 A1* | 1/2011 | Werth | H04L 67/34 707/803 |
| 2011/0093249 A1* | 4/2011 | Holmes | G06F 19/00 703/6 |
| 2011/0110364 A1* | 5/2011 | Fried | H04M 3/5191 370/352 |
| 2011/0191115 A1* | 8/2011 | Zalam | G06Q 50/22 705/2 |
| 2012/0016607 A1* | 1/2012 | Cottrell | G05B 23/0229 702/62 |
| 2012/0246102 A1* | 9/2012 | Sudharsan | G06N 7/005 706/25 |
| 2012/0323385 A1 | 12/2012 | Thiruvengada et al. | |
| 2013/0007501 A1* | 1/2013 | Areal | G06Q 10/20 714/2 |
| 2013/0132854 A1* | 5/2013 | Raleigh | G06F 3/0482 715/738 |
| 2013/0191213 A1* | 7/2013 | Beck | G06Q 30/0267 705/14.53 |
| 2013/0198767 A1* | 8/2013 | Wang | H04L 65/80 725/14 |
| 2013/0212083 A1* | 8/2013 | Beattie | G06Q 10/0633 707/707 |
| 2013/0218616 A1* | 8/2013 | Pinchuk | G06Q 30/0202 705/7.11 |
| 2013/0290512 A1* | 10/2013 | Ngoo | H04L 41/147 709/224 |
| 2014/0019457 A1 | 1/2014 | Xie | |
| 2014/0040343 A1* | 2/2014 | Nickolov | G06F 9/4856 709/201 |
| 2014/0044243 A1* | 2/2014 | Monegan | G06Q 30/016 379/88.01 |
| 2014/0081846 A1 | 3/2014 | Gallagher et al. | |
| 2014/0172576 A1* | 6/2014 | Spears | G06Q 30/0266 705/14.63 |
| 2014/0278690 A1* | 9/2014 | Agarwal | G06Q 10/06312 705/7.22 |
| 2014/0344718 A1* | 11/2014 | Rapaport | H04L 51/32 715/753 |
| 2014/0379615 A1* | 12/2014 | Brigham | G06N 5/02 706/11 |
| 2015/0006247 A1 | 1/2015 | Batra et al. | |
| 2015/0135206 A1* | 5/2015 | Reisman | H04N 21/26283 725/18 |
| 2015/0142513 A1* | 5/2015 | Shnayder | G06Q 30/0206 705/7.31 |
| 2015/0213225 A1* | 7/2015 | Amarasingham | G06F 19/00 705/2 |
| 2015/0235240 A1* | 8/2015 | Chang | G06Q 30/0202 705/7.31 |
| 2015/0254675 A1* | 9/2015 | Kannan | G06Q 30/02 705/304 |
| 2015/0271557 A1* | 9/2015 | Tabe | H04N 21/4788 725/14 |
| 2016/0105814 A1* | 4/2016 | Hurst | H04W 12/08 370/252 |
| 2016/0171511 A1 | 6/2016 | Goel et al. | |
| 2016/0196587 A1* | 7/2016 | Eder | G06Q 30/00 705/14.49 |
| 2016/0203497 A1 | 7/2016 | Tietzen et al. | |
| 2016/0217124 A1* | 7/2016 | Sarikaya | G06F 17/2765 |
| 2016/0239848 A1* | 8/2016 | Chang | G06Q 30/016 |
| 2016/0283304 A1* | 9/2016 | Horikawa | G06F 11/3409 |
| 2016/0342911 A1* | 11/2016 | Kannan | G06Q 10/0631 |
| 2016/0350674 A1* | 12/2016 | Midboe | H04L 67/327 |
| 2016/0357911 A1* | 12/2016 | Dillon | G06F 19/324 |
| 2016/0360336 A1* | 12/2016 | Gross | H04W 4/50 |
| 2017/0004408 A1* | 1/2017 | Edelen | G06N 5/02 |
| 2017/0024656 A1* | 1/2017 | Gilon | G16H 20/70 |
| 2017/0041296 A1* | 2/2017 | Ford | H04L 63/0421 |
| 2017/0068976 A1* | 3/2017 | Wawrzynowicz | G06Q 30/0203 |
| 2017/0083626 A1* | 3/2017 | Kensel | G06N 5/04 |
| 2017/0124263 A1* | 5/2017 | Crafts, Jr. | G16H 40/20 |
| 2017/0132024 A1* | 5/2017 | Desineni | G06F 8/30 |
| 2017/0140285 A1* | 5/2017 | Dotan-Cohen | G06F 3/01 |
| 2017/0172462 A1* | 6/2017 | Alghazi | A61G 5/10 |
| 2018/0032997 A1* | 2/2018 | Gordon | G06Q 30/0269 |
| 2018/0107920 A1* | 4/2018 | Jayaraman | G06F 17/11 |

* cited by examiner

WEB INTERFACE USAGE TRACKER

BACKGROUND

Increasingly, users access a variety of goods and services over the Internet via web portals. For example, customer web portals implemented by financial services institutions provide customers with the ability to conduct routine financial transactions automatically over the Internet. Transactions that would have previously required telephone or even face-to-face contact between the customer and a teller, broker, or even financial advisor can now be conducted from the convenience of the customer's home or remotely via the customer's mobile computing device. While reducing direct contact between customers and bank personnel can be convenient for customers in some cases, usage of such Internet-centric systems also make it difficult for a service provider to provide personalized customer service. Customer problems and needs that likely would have become apparent in direct conversations with the customer may thus go unnoticed. Embodiments of the present disclosure address these and other issues.

BRIEF DESCRIPTION OF THE DRAWINGS

In the drawings, which are not necessarily drawn to scale, like numerals can describe similar components in different views. Like numerals having different letter suffixes can represent different instances of similar components. Some embodiments are illustrated by way of example, and not of limitation, in the figures of the accompanying drawings, in which.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Among other things, embodiments of the present disclosure can help monitor activity of customers using web portals to access services. Examples of such activity include log-ins to a web portal, views of account statements through the web portal, transactions made on the account, and the like. Embodiments of the present disclosure can generate a model relating customer characteristics to expected account activity. The system can apply the model to individual customers and compares actual account activity to expected account activity. If a mismatch is detected, the system may generate an alert message directed to an administrator, financial advisor, or other type of user who can contact the customer to troubleshoot the identified issues.

Figure 1:
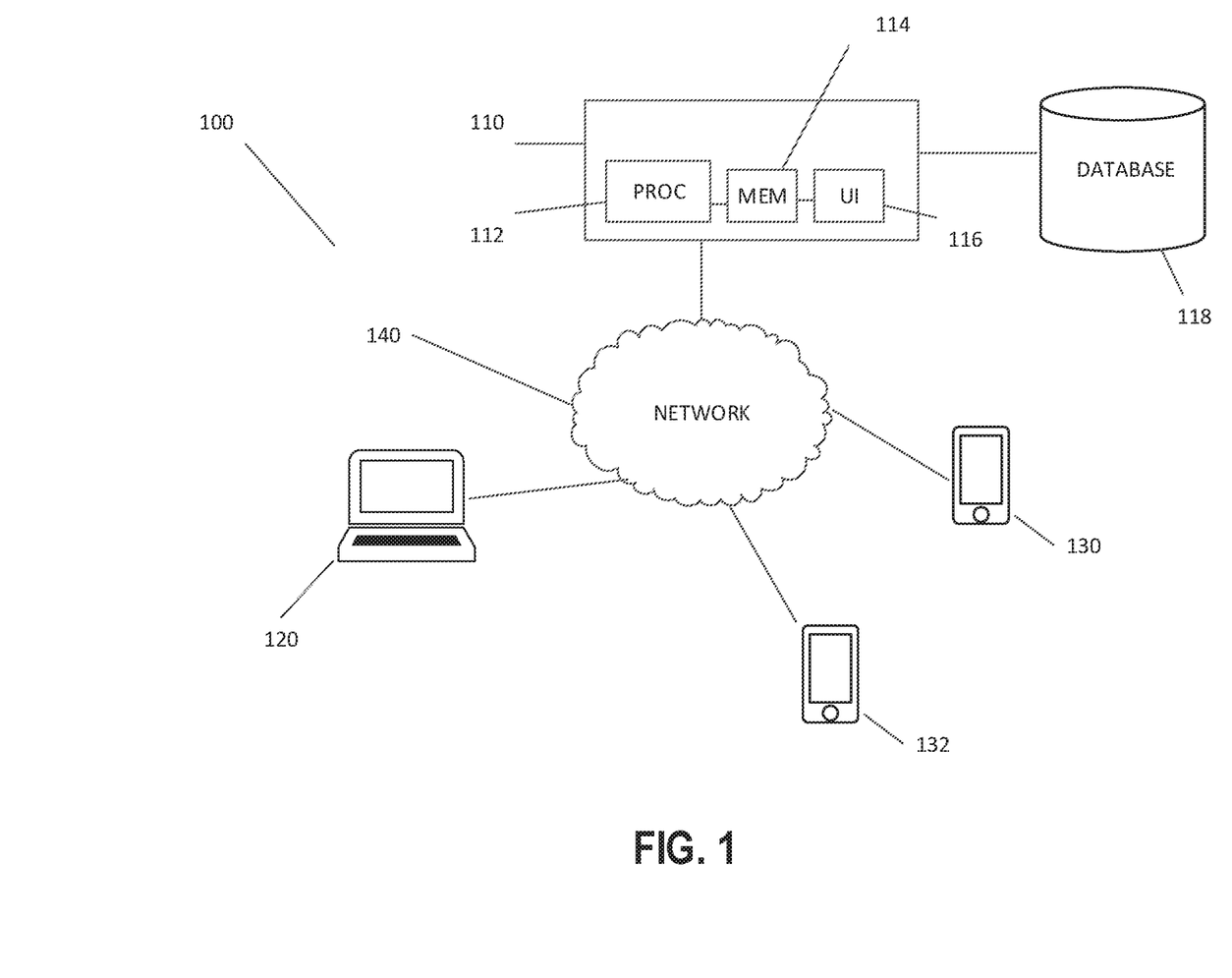
FIG. 1 illustrates a block diagram of an exemplary system according to various aspects of the disclosure.

FIG. 1 is a block diagram of system which may be used in conjunction with various embodiments. While FIG. 1 illustrates various components of a computer system, it is not intended to represent any particular architecture or manner of interconnecting the components. Other systems that have fewer or more components may also be used.

In FIG. 1, the system 100 includes a server computer system 110 comprising a processor 112, memory 114, and user interface 116. Computer system 110 may include any number of different processors, memory components, and user interface components, and may interact with any other desired systems and devices in conjunction with embodiments of the present disclosure.

The functionality of the computer system 110, including the steps of the methods described below (in whole or in part), may be implemented through the processor 112 executing computer-readable instructions stored in the memory 114 of the system 110. The memory 114 may store any computer-readable instructions and data, including software applications, applets, and embedded operating code. Portions of the functionality of the methods described herein may also be performed via software operating on one or more of the client computing devices 120, 122, 130.

The functionality of the system 110 or other system and devices operating in conjunction with embodiments of the present disclosure may also be implemented through various hardware components storing machine-readable instructions, such as application-specific integrated circuits (ASICs), field-programmable gate arrays (FPGAs) and/or complex programmable logic devices (CPLDs). Systems according to aspects of certain embodiments may operate in conjunction with any desired combination of software and/or hardware components. The processor 112 retrieves and executes instructions stored in the memory 114 to control the operation of the system 110. Any type of processor, such as an integrated circuit microprocessor, microcontroller, and/or digital signal processor (DSP), can be used in conjunction with embodiments of the present disclosure. A memory 114 operating in conjunction with embodiments of the disclosure may include any combination of different memory storage devices, such as hard drives, random access memory (RAM), read only memory (ROM), FLASH memory, or any other type of volatile and/or nonvolatile memory. Data can be stored in the memory 114 in any desired manner, such as in a relational database.

The system 110 includes a user interface 116 that may include any number of input devices (not shown) to receive commands, data, and other suitable input. The user interface 116 may also include any number of output devices (not shown) to provides the user with data, notifications, and other information. Typical I/O devices may include mice, keyboards, modems, network interfaces, printers, scanners, video cameras and other devices.

The system 110 may communicate with one or more client computing devices 120, 122, 130 as well as other systems and devices in any desired manner, including via network 140. The system 110 and/or computing devices 120, 122, 130 may be, include, or operate in conjunction with, a laptop computer, a desktop computer, a mobile subscriber communication device, a mobile phone, a personal digital assistant (PDA), a tablet computer, an electronic book or book reader, a digital camera, a video camera, a video game console, and/or any other suitable computing device. In one exemplary embodiment, described in more detail below, client computing device 120 is operated by a first service provider, client computing device 122 is operated by a second service provider, and client computing device 130 is operated by a customer seeking a service provided by one or both the first service provider and the second service provider. Embodiments of the present disclosure may operate in conjunction with any number of different customer and/or provider computing devices.

The network 140 may include any electronic communications system or method. Communication among components operating in conjunction with embodiments of the present disclosure may be performed using any suitable communication method, such as, for example, a telephone network, an extranet, an intranet, the Internet, point of interaction device (point of sale device, personal digital assistant (e.g., iPhone®, Palm Pilot®, Blackberry®), cellular phone, kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Systems and devices of the present disclosure may utilize TCP/IP communications protocols as well as IPX, Appletalk, IP-6, NetBIOS, OSI, any tunneling protocol (e.g. IPsec, SSH), or any number of existing or future protocols.

The system 110 may include (e.g., in the memory 114) a database, and may communicate with any number of other databases, such as database 118. Any such databases may include a relational, hierarchical, graphical, or object-oriented structure and/or any other database configurations. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically.

Figure 2:
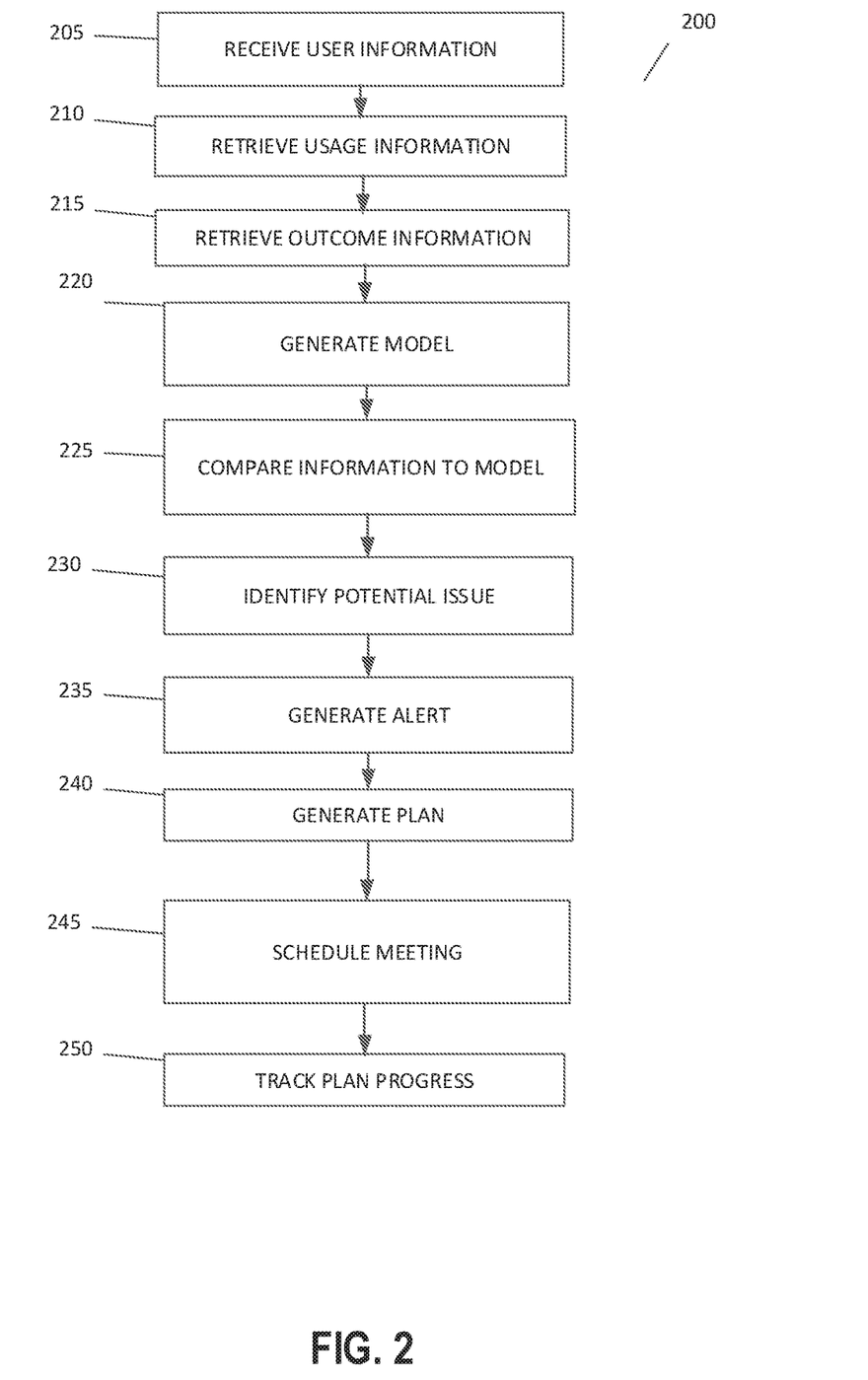
FIG. 2 is a flow diagram of an exemplary process according to various aspects of the disclosure.
Figure 3:
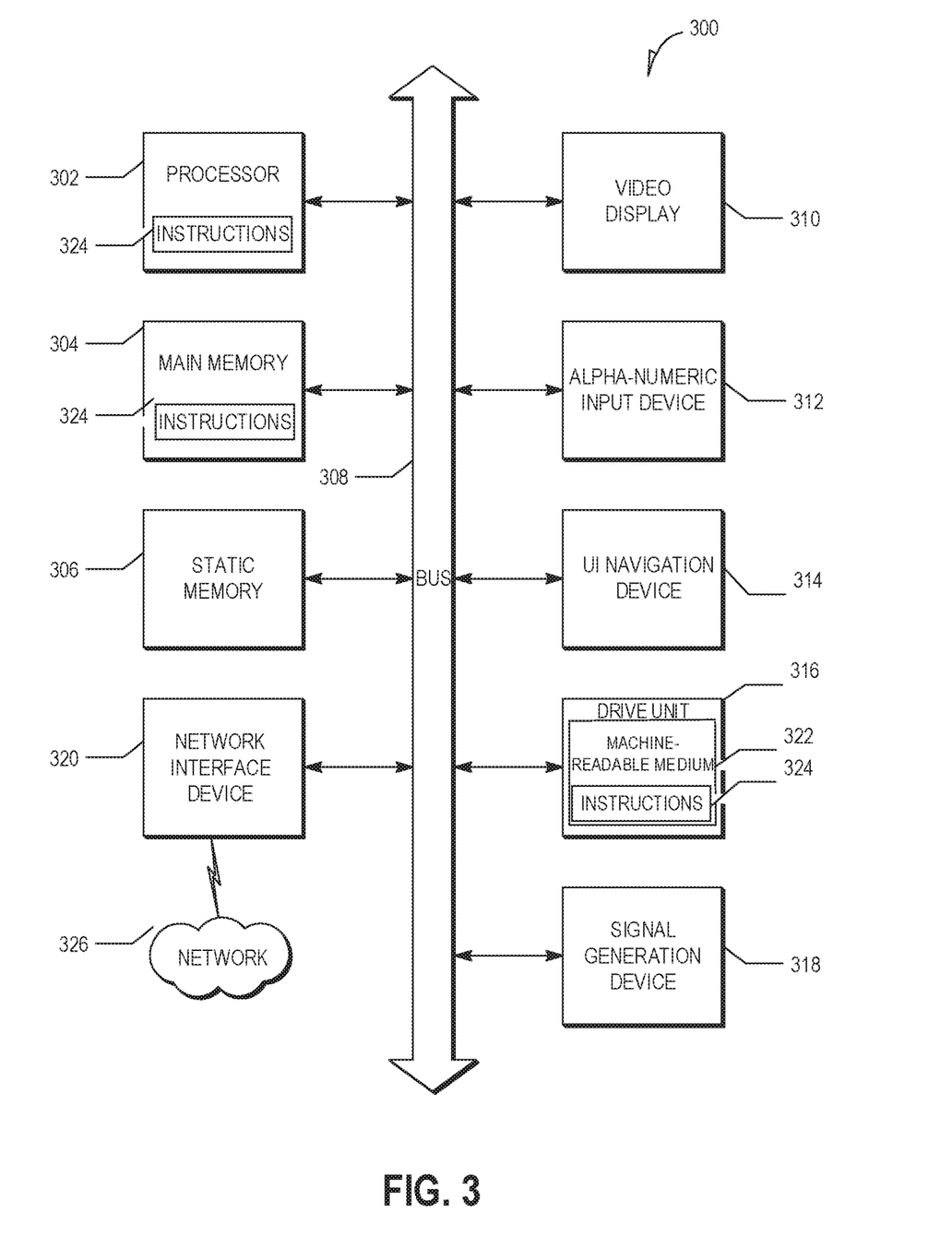
FIG. 3 is a block diagram of an exemplary machine according to various aspects of the disclosure.

FIG. 2 depicts an exemplary process according to various aspects of the present disclosure. In this example, method 200 includes receiving user information (205), retrieving usage information (210) associated with interactions between a user and a system via a web portal, receiving outcome information (215) associated with the user interactions, and generating a model (220) for predicting usage of the system by future users. Method 200 further includes comparing usage and outcome information associated with a second user to the model (225), identifying a potential issue with the second user's usage of the system (230), generating an alert associated with the potential issue (235), generating a plan to address the issue (240), scheduling a meeting between the second user and a service provider as part of the plan (245), and tracking progress of the plan (250). The steps of method 200 may be performed in whole or in part, may be performed in conjunction with some or all of the steps in other methods, and may be performed by any number of different systems, such as the systems described in FIGS. 1 and/or 3.

Embodiments of the present disclosure may be used to help identify potential issues from users' interactions with an Internet-based system via a web portal. For example, in the system 100 shown in FIG. 1, a server computer system 110 communicates (over network 140) with the computing device of a service provider 120 and a computing device of a first customer 130 and a computing device of a second customer 132 (customers may also be referred to herein as "users"). The customer and/or service provider may be or include any number of different individuals, organizations, systems, devices, and the like. While three computing devices are shown in the exemplary system in FIG. 1, embodiments of the present disclosure may also operate in conjunction with any number of different customer and/or service provider computer systems.

In the exemplary method 200 shown in FIG. 2, the system (e.g., server computer system 110 in FIG. 1) receives information associated with the user/customer (205). A variety of information about the user may be received, such as the user's name, address, demographic information, one or more services the user is seeking, etc. In the case of a user seeking financial planning services, for example, the user information may include the customer's financial goals (e.g., asset accumulation, asset distribution, asset protection, etc.), the type and/or value of assets the customer has, demographic information on the customer (such as the customer's age and marital status), and other information.

The user information may be received (205) from a variety of sources. In some embodiments, user information is received from a database in communication with the system (e.g., from the memory 114 or database 118 in communication with the server computer system 110 in FIG. 1). In other embodiments, the system may request such information from the user via, for example, an electronic communication from the system 110 to the user's computing device 130 (e.g., in a text message, email, chat, and/or other electronic communications). The user information may also be received by the system 110 via selections and entries made by the user via a web page. Furthermore, the user information may be transmitted to the server using software features of the system 110 accessible to the customer's computing device 120 via an application programming interface (API). In some embodiments, the system may be controlled by a financial institution or other entity with whom the user/customer has a financial account. In such cases, the system can request authorization from the customer to retrieve information regarding the customer. The customer can pre-authorize such retrieval or authorize the retrieval on a case-by-case basis.

The system retrieves usage information (210) associated with interactions between the user and the system 110 via a web portal. The usage information may include; for example, information on online services used by the user via the web portal (e.g., viewing the balance of the user's financial account, transferring funds between one account and another, etc.), performing a search on a website hosted by the system, links and other constructs selected by the user, articles and other content viewed by the user; and the like.

The system further retrieves outcome information (215) associated with the user's interactions with the system. For example, where a user's interaction includes performing a web site search, the outcome information may include a list of the search results from the search, as well as a list of the search results viewed by the user. Outcome information may also include explicit attempts by the user to seek help via the web portal, such as by selecting options on a website to contact customer service. The system may identify whether attempts by the user to contact customer service (or perform another action) were successful or whether the user still may have an outstanding issue that needs resolving, as discussed in more detail below.

Embodiments of the present disclosure may utilize the information about the customer, the usage information, and the outcome information to generate a model (220) for predicting usage of the system via the web portal by future users. The system may generate and update the model based on usage and outcome information for any number of users to predict how a future user is likely to use the system. For example, the system may determine, via the model, that out of a thousand users that use the system via the web portal, ninety-five percent of the users check the balance of their financial account during the visit, and that twenty-five percent of users attempt to contact customer service to address a transaction associated with their financial account. The model may be updated and modified as new information is gathered, and as features available via the web portal change. For example, the model may be trained to predict how users will utilize a newly-added feature on a website (e.g., accessed via hyperlink) as usage and outcome information is collected subsequent to adding the feature.

As customers interact with the system, the system retrieves the usage (210) and outcome (215) information associated with their interactions with the system both to update the model and to compare to the model (225) to determine whether there may be potential issues indicated from the user's interactions that warrant follow-up by the system or an alert generated to an administrator or service provider.

For example, consider a simple model generated based on the usage and outcome information associated with the system 110 by a first user via the first user's computing device 130. A second user (using a second computing device 132) subsequently interacts with the system via a web portal over network 140 (e.g., the Internet) and the system receives information about the second user (205) and retrieves usage (210) and outcome (215) information associated with the second user's interactions with the system. In some embodiments, the usage information and outcome information for the second user could be retrieved over a predetermined time period. Among other things, this allows the system to identify patterns in the user's interactions, to determine whether the user is able to resolve an initial issue after a subsequent interaction with the system, and to monitor the usage of the system by new (or newer) customers to help ensure the users are getting full benefit from the features offered by system.

The system can compare the usage and outcome information associated with the second user to the model (225) to identify a potential issue (230) associated with the second user's interactions with the system. For example, the system may compare the second user's usage information and output information to the model and determine that while other users (e.g., the first user in the example above) successfully transferred balances from one financial account to another using a sequence of three menu options, the second user tried (unsuccessfully) four times to transfer a balance from one financial account to another because the second user repeatedly omitted selecting one of the menu options. In this example, the system may generate an alert (235) identifying one or more potential issues, namely: (1) that the second user may still need to perform the balance transfer and (2) that the second user may need guidance in using the system to effect balance transfers in the future.

The system may transmit the alert to various entities depending on the nature of the issue identified with a user's interaction with the system via the web portal. For example, in a case where the interactions of a user with the system indicate an error (such as a dead link on the system's website or other failure) the system may transmit the alert to an administrator of the system to correct the error. In other cases, where the issue is associated with a potential services need by the user, for example, the system may transmit the alert to a service provider that can address the need.

In cases where the issue identified for a user is related to a need for services, the system can help facilitate providing the service to the user. For example, consider a case where the issue identified for a user is related to the user seeking help in setting up a will and trust and receiving other estate planning guidance. The system can automatically generate a plan (240) identifying each step the user must take to achieve the user's objective. The system may further help execute the plan by identifying providers of services the user will need to achieve the user's objective.

For example, the system may (with the user's approval) schedule a meeting between the user and a service provider by transmitting meeting requests to the user's computing device 132 and the service provider's computing device 120. Embodiments of the present disclosure may communicate with the user computing devices 130, 132 and service provider computing device 120 using any desired electronic communication format, such as short message service (SMS) or multimedia message service (MMS) text messages, emails, instant messages (1M), Internet relay chat (IRC), and other communications.

The system may also track the user's progress in satisfying the plan and generate further alerts in cases where the plan is not being achieved as expected. In this manner, the system can not only assist users in using the features of the system, but seek assistance from outside sources to help the user achieve his/her objectives.

FIG. 3 is a block diagram illustrating exemplary components of a computing system 300 that may operate in conjunction with embodiments of the present disclosure. System 300 (in whole or in part) may be (or include) any of the computing devices 110, 120, 122, 130 shown in FIG. 1. In this example, system 300 reads instructions 324 from a machine-readable medium (e.g., a tangible, non-transitory, machine-readable storage medium) 322 to perform a variety of functions, including any of the processes (in whole or in part) described herein.

System 300 can be connected (e.g., networked) to other machines. In a networked deployment, the system 300 can operate in the capacity of a server machine or a client machine in a server-client network environment, as well as a peer machine in a peer-to-peer (or distributed) network environment. System 300 may be (or include) a server computer, a client computer, a personal computer (PC), a tablet computer, a laptop computer, a netbook, a set-top box (STB), a personal digital assistant (PDA), a cellular telephone, a smartphone; a web appliance, a network router; a network switch, a network bridge, or any machine capable of executing the instructions 324, sequentially or otherwise, that specify actions to be taken by that machine. While only a single machine is illustrated in FIG. 3, the term "machine" or "system" as used herein may also include any number of different devices, systems, and/or machines that individually or jointly execute the instructions 324 to perform any one or more of the methodologies discussed herein. Additionally, alternate systems operating in conjunction with the embodiments of the present disclosure may have some; all, or multiples of the components depicted in FIG. 3.

In the example shown in FIG. 3, system 300 includes processor 302. Any processor may be used in conjunction with the embodiments of the present disclosure, such as a central processing unit (CPU), a graphics processing unit (GPU), a digital signal processor (DSP), an application specific integrated circuit (ASIC), a radio-frequency integrated circuit (RFIC), or any suitable combination thereof.

System 300 further includes a main memory 304 and a static memory 306, which are configured to communicate with each other via a bus 308.

The system 300 further includes a user interface that may include a variety of components, including one or more output devices such as a graphics display 310 (e.g., a plasma display panel (PDP), a light emitting diode (LED) display, a liquid crystal display (LCD), a projector, or a cathode ray tube (CRT)). The user interface of the system 300 may also include any number of input devices and other components, including an alphanumeric input device 312 (e.g., a keyboard), a cursor control device 314 (e.g., a mouse, a touchpad, a trackball, a joystick, a motion sensor, or other pointing instrument), a storage unit 316, a signal generation device 318 (e.g., a speaker), and a network interface device 320.

The storage unit 316 includes a machine-readable medium 322 on which is stored the instructions 324 (e.g., software) embodying any one or more of the methodologies or functions described herein. The instructions 324 can also reside, completely or at least partially, within the main memory 304, within the processor 302 (e.g., within the processor's cache memory), or both, during execution thereof by the system 300. Accordingly, the main memory 304 and the processor 302 can be considered as machine-readable media. The instructions 324 can be transmitted or received over a network 326 via the network interface device 320.

As used herein, the term "memory" may refer to any machine-readable medium able to store data temporarily or permanently, including random-access memory (RAM), read-only memory (ROM), buffer memory, flash memory, and/or cache memory. While the machine-readable medium 322 is shown in this example as a single medium, the term "machine-readable medium" may include a single medium or multiple media (e.g., a centralized or distributed database, or associated caches and servers) able to store instructions 324. The term "machine-readable medium" may also include any medium, or combination of multiple media, that is capable of storing instructions (e.g., software) 324 for execution by a machine. Accordingly, a "machine-readable medium" refers to a single storage apparatus or device, as well as "cloud-based" storage systems or storage networks that include multiple storage apparatus or devices. The term "machine-readable medium" may also include one or more data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific exemplary embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the teens "first," "second," and "third," etc. are used merely as labels, and are not intended to impose numerical requirements on their objects.

What is claimed is:

1. A system for providing services to a user via a web portal, the system comprising:
    a processor; and
    memory coupled to the processor and storing instructions that, when executed by the processor, cause the system to perform operations comprising:
        receiving, from a client computing device of a user over the Internet, information associated with the user;
        retrieving, from the memory, usage information associated with at least one interaction between the user and the system via the web portal, the at least one interaction between the user and the system comprising a sequence of menu option selections from the web portal to receive a first service;
        retrieving, from the memory, outcome information describing outcomes associated with the interactions between the user and the system, the outcome information comprising an indication of a help request from the user;
        generating a model based on the information associated with the user, the usage information, and the outcome information, the model for predicting usage of the system via the web portal by future users;
        after generating the model, receiving additional information associated with a plurality of users of the web portal, additional usage information associated with interactions between the plurality of users of the web portal and the system, and additional outcome information describing outcomes associated with the interactions between the plurality of users of the web portal and the system;

updating the model using the additional information associated with the plurality of users, the additional usage information, and the additional outcome information;

receiving, from a second client computing device of a second user, second usage information associated with at least one interaction between the second user and the system via the web portal;

determining, using the model, that the second user omitted selecting at least one menu option from the sequence of menu options from the web portal, the sequence of menu options predicted by the model for the second user based on the second usage information, the determining comprising determining that second user executed a second sequence of menu options omitting the at least one menu option more than a threshold number of times;

generating an alert, the alert indicating the omitted at least one menu option and the first service; and sending, to the second client computing device, a meeting request describing a proposed meeting between the second user and a service provider for providing the first service.

2. The system of claim 1, wherein the memory further stores instructions for causing the system to perform operations comprising:

retrieving, from the memory, second outcome information describing outcomes associated with the interactions between the second user and the system; and determining, based at least in part on the outcome information, that an outcome associated with the at least one menu option did not occur.

3. The system of claim 2, wherein the second usage information for the second user and the second outcome information for the second user is associated with interactions between the second user and the system over a predetermined time period.

4. The system of claim 2, wherein the memory further stores instructions for causing the system to perform operations comprising:

comparing the second usage information for the second user and the second outcome information for the second user with the model for predicting usage of the system;

identifying, based on the comparison of the second usage information for the second user and the second outcome information for the second user with the model for predicting usage of the system, a potential issue associated with the second user's interactions with the system via the web portal; and generating the alert in response to identifying the potential issue.

5. The system of claim 4, wherein the potential issue is associated with an error and the alert is transmitted to an administrator of the system.

6. The system of claim 4, wherein the alert is transmitted to the service provider.

7. The system of claim 6, wherein the memory further stores instructions for causing the system to perform operations comprising:

generating a plan for addressing a services need of the second user using the service provider; and tracking progress of the service provider in providing the first service to the second user.

8. A method comprising:

receiving, from a client computing device of a user over the Internet by a computer system, information associated with the user;

retrieving, by the computer system from memory coupled to the computer system, usage information associated with at least one interaction between the user and the computer system via a web portal, the at least one interaction between the user and the system comprising a sequence of menu option selections from the web portal to receive a first service;

retrieving, by the computer system from the memory, outcome information describing outcomes associated with the interactions between the user and the computer system, the outcome information comprising an indication of a help request from the user;

generating, by the computer system, a model based on the information associated with the user, the usage information, and the outcome information, the model for predicting usage of the computer system via the web portal by future users;

after generating the model, receiving additional information associated with a plurality of users of the web portal, additional usage information associated with interactions between the plurality of users of the web portal and the system, and additional outcome information describing outcomes associated with the interactions between the plurality of users of the web portal and the system;

updating the model using the additional information associated with the plurality of users, the additional usage information, and the additional outcome information;

receiving, from a second client computing device of a second user, second usage information associated with at least one interaction between the second user and the system via the web portal;

determining, using the model, that the second user omitted selecting at least one menu option from the sequence of menu option from the web portal, the sequence of menu options predicted by the model for the second user based on the second usage information, the determining comprising determining that second user executed a second sequence of menu options omitting the at least one menu option more than a threshold number of times;

generating an alert, the alert indicating the omitted at least one menu option and the first service; and sending, to the second client computing device, a meeting request describing a proposed meeting between the second user and a service provider for providing the first service.

9. The method of claim 8, further comprising:

retrieving, from the memory by the computer system, second outcome information describing outcomes associated with the interactions between the second user and the computer system; and determining, based at least in part on the outcome information, that an outcome associated with the at least one menu option did not occur.

10. The method of claim 9, wherein the second usage information for the second user and the second outcome information for the second user is associated with interactions between the second user and the system over a predetermined time period.

11. The method of claim 9, further comprising:

comparing, by the computer system, the second usage information for the second user and the second outcome information for the second user with the model for predicting usage of the computer system;

identifying, by the computer system based on the comparison of the second usage information for the second user and the second outcome information for the second user with the model for predicting usage of the computer system, a potential issue associated with the second user's interactions with the system via the web portal; and generating, by the computer system, the alert in response to identifying the potential issue.

12. The method of claim 11, wherein the potential issue is associated with an error and the alert is transmitted to an administrator of the system.

13. The method of claim 11, wherein the alert is transmitted to the service provider.

14. The method of claim 13, further comprising:

generating, by the computer system, a plan for addressing a services need of the second user using a service provider; and tracking, by the computer system, progress of the service provider in providing the first service to the second user.

15. A non-transitory computer-readable medium storing instructions that, when executed by a computer system, cause the computer system to perform operations comprising:

receiving, from a client computing device of a user over the Internet, information associated with the user;

retrieving, from memory coupled to the system, usage information associated with at least one interaction between the user and the computer system via a web portal, the at least one interaction between the user and the system comprising a sequence of menu option selections from the web portal to receive a first service;

retrieving, from the memory, outcome information describing outcomes associated with the interactions between the user and the computer system, the outcome information comprising an indication of a help request from the user;

generating a model based on the information associated with the user, the usage information, and the outcome information; the model for predicting usage of the system via the web portal by future users;

after generating the model, receiving additional information associated with a plurality of users of the web portal, additional usage information associated with interactions between the plurality of users of the web portal and the system and additional outcome information describing outcomes associated with the interactions between the plurality of users of the web portal and the system;

updating the model using the additional information associated with the plurality of users, the additional usage information, and the additional outcome information;

receiving, from a second client computing device of a second user, second usage information associated with at least one interaction between the second user and the system via the web portal;

determining, using the model, that the second user omitted selecting at least one menu option from the sequence of menu option from the web portal, the sequence of menu options predicted by the model for the second user based on the second usage information, the at least one interaction action associated with provision of a first service to the second user, the determining comprising determining that second user executed a second sequence of menu options omitting the at least one menu option more than a threshold number of times;

generating an alert, the alert indicating the omitted at least one menu option and the first service; and sending, to the second client computing device, a meeting request describing a proposed meeting between the second user and a service provider for providing the first service.

16. The computer-readable medium of claim 15, wherein the medium further stores instructions for causing the computer system to perform operations comprising:

retrieving, from the memory, second outcome information describing outcomes associated with the interactions between the second user and the computer system; and determining, based at least in part on the outcome information, that an outcome associated with the at least one menu option did not occur.

17. The computer-readable medium of claim 16, wherein the second usage information for the second user and the second outcome information for the second user is associated with interactions between the second user and the system over a predetermined time period.

* * * * *

UNITED STATES PATENT AND TRADEMARK OFFICE
CERTIFICATE OF CORRECTION

PATENT NO.         : 10,979,305 B1
APPLICATION NO.    : 15/394665
DATED              : April 13, 2021
INVENTOR(S)        : Finci et al.

Page 1 of 1

It is certified that error appears in the above-identified patent and that said Letters Patent is hereby corrected as shown below:

In the Claims

In Column 11, Line 43, in Claim 15, delete "information;" and insert --information,-- therefor In Column 12, Line 2, in Claim 15, after "system", insert --,--

In Column 12, Line 19, in Claim 15, after "interaction", delete "action"

Signed and Sealed this
Third Day of August, 2021

Drew Hirshfeld
*Performing the Functions and Duties of the
Under Secretary of Commerce for Intellectual Property and
Director of the United States Patent and Trademark Office*